May 16, 1933.    J. MAGIDSON ET AL    1,909,779
ALTERNATING WINDSHIELD
Filed Nov. 2, 1932    4 Sheets-Sheet 2
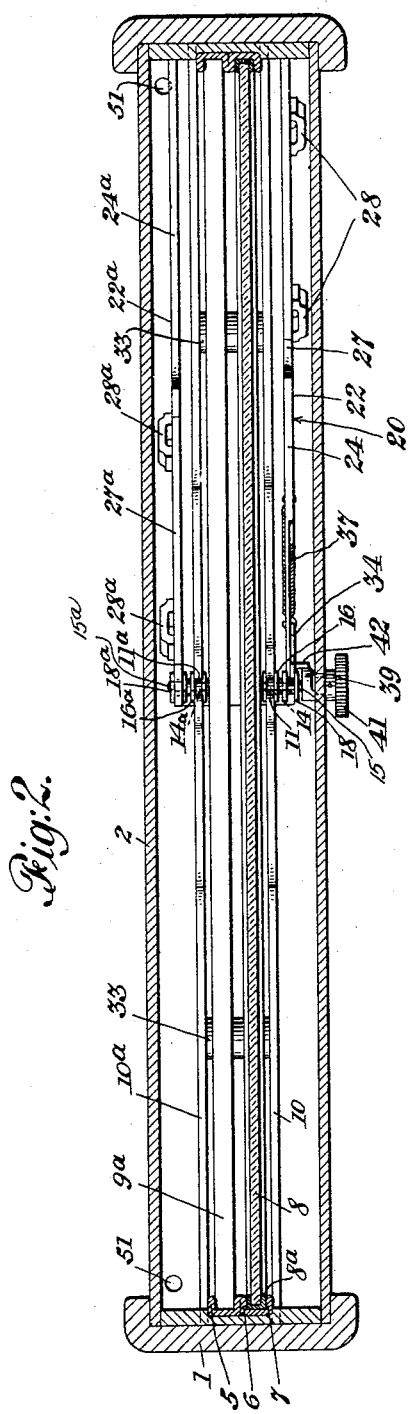
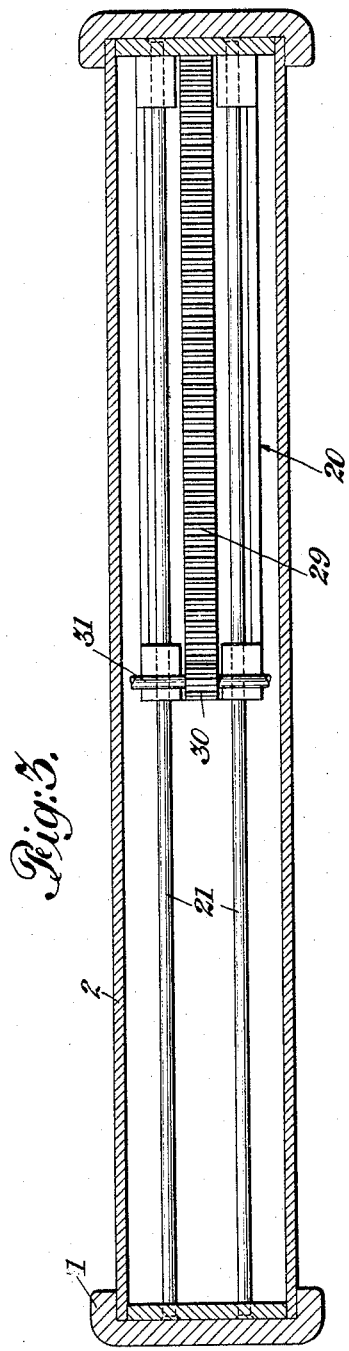
INVENTORS
Joseph Magidson, Sidney E. Barth
and Harry Magidson
BY
Louis Prevost Whitaker
ATTORNEY

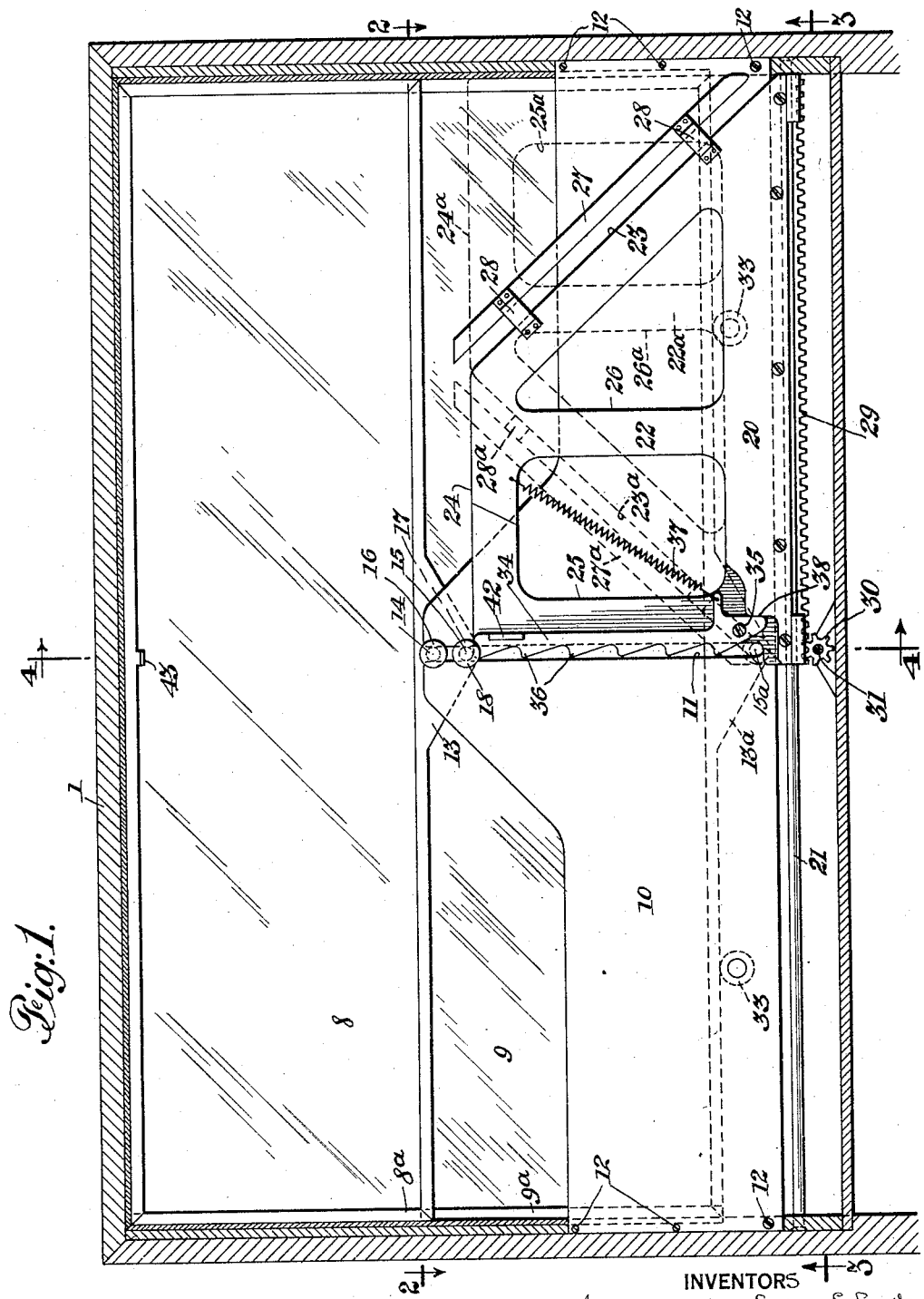

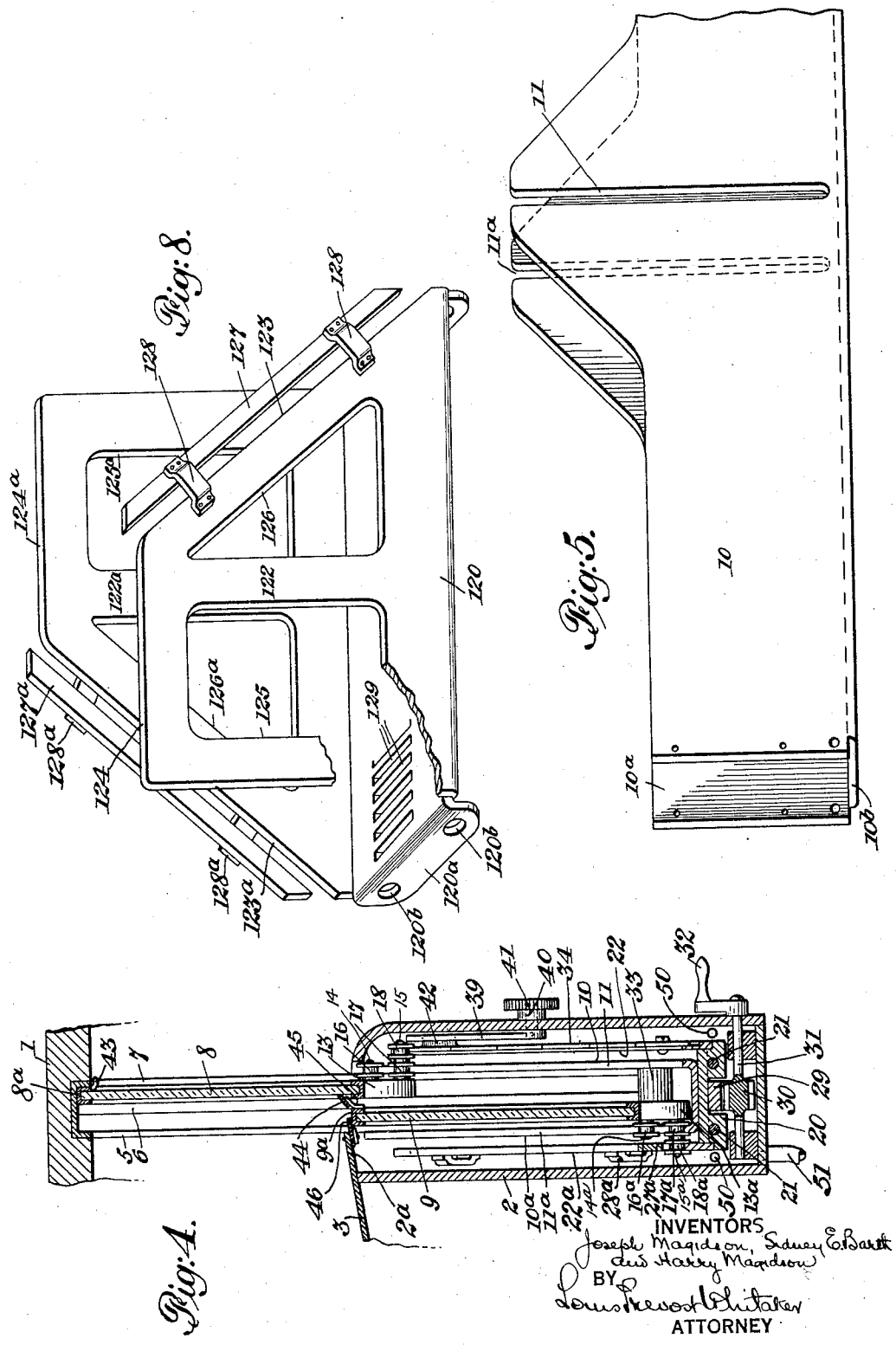

May 16, 1933.  J. MAGIDSON ET AL  1,909,779
ALTERNATING WINDSHIELD
Filed Nov. 2, 1932  4 Sheets-Sheet 4
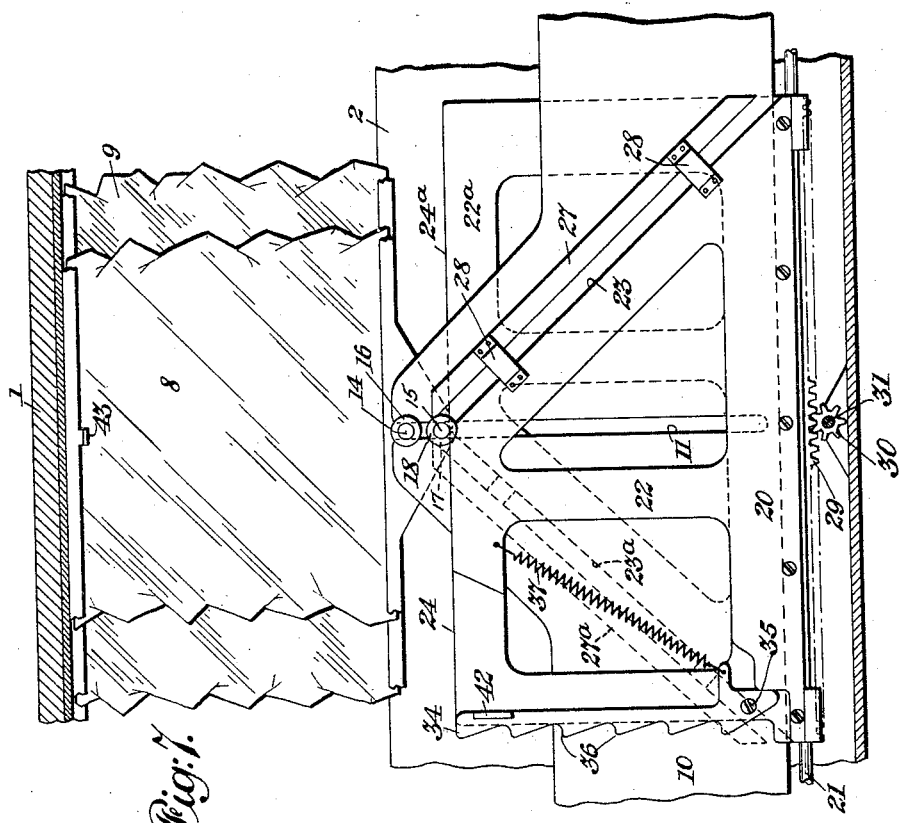
INVENTORS
Joseph Magidson, Sidney E. Barth
and Harry Magidson
BY
Louis Prevost Whitaker,
ATTORNEY Patented May 16, 1933

1,909,779

UNITED STATES PATENT OFFICE

JOSEPH MAGIDSON, SIDNEY E. BARTH, AND HARRY MAGIDSON, OF NEW YORK, N. Y.

ALTERNATING WINDSHIELD

Application filed November 2, 1932. Serial No. 640,740.

Our invention consists in the novel features hereinafter described, reference being had to the accompanying drawings which illustrate two embodiments of the same, selected by us for purposes of illustration, and the said invention is fully disclosed in the following description and claims.

This application is an improvement upon the invention disclosed in the application of Sidney E. Barth and Harry Magidson, for improvements in Alternating windshield, filed in the United States Patent Office April 27, 1932, and given Serial Number 607,680.

The object of the invention is to provide an alternating windshield construction for automotive vehicles comprising two windshield sashes, one of which is under ordinary circumstances at all times in operative or exposed position, the other being normally enclosed in a trunk or receptacle within the vehicle, where it is subjected to heat from the engine or other heating source, in combination with a sash alternating mechanism constructed to raise the enclosed sash to full operative position, that is to say, to close the windshield aperture and hold it in that position, after which the previously exposed windshield sash may be released from its holding means, and lowered into the trunk. In this manner whenever weather conditions make it desirable, the sashes may be alternated at any desired intervals of time, so that the exposed sash if coated with rain, snow, or ice, can be dried and the moisture evaporated while it is within the trunk. It is to be understood that the sash alternating mechanism, when brought into operation, will effect the full movement of the enclosed sash to operative position before any movement of the previously exposed sash to enclosed position takes place, to the end that at no time shall any portion of the windshield aperture be opened to admit air, rain, snow, hail or dust, thus protecting the driver at all times and avoiding the possibility of interfering with the driver's view of the road, or lowering the temperature of the interior of the vehicle. Our present invention relates more particularly to the construction and operation of the sash alternating mechanism, which is of extremely simple construction capable of being manufactured cheaply and operated efficiently without any material danger of getting out of order.

Our invention also includes certain novel features whereby when the weather is pleasant and the innermost sash is in the raised or exposed position, it may be temporarily lowered to a greater or less extent manually, and independently of the sash alternating mechanism, if this should be desirable for the purpose of ventilating or cooling the interior of the vehicle, and thereafter raised to its fully exposed position, completely closing the windshield aperture and again restored to the control of the sash alternating mechanism.

Our invention also comprises certain novel features of construction and combination of parts, hereinafter fully pointed out in the claims.

Referring to the accompanying drawings,

Fig. 1 is an elevation, partly in section, showing our improved alternating windshield construction, with the inner wall of the trunk removed to expose the sash alternating mechanism therein, the inner sash being shown in fully raised position, and the exterior sash in lowered position within the trunk.

Fig. 2 represents a horizontal section through the apparatus on the line 2—2 of Fig. 1, looking downward in the direction of the arrows in that figure.

Fig. 3 represents a horizontal section on the line 3—3 of Fig. 1, looking upward in the direction of the arrows in that figure.

Fig. 4 represents a transverse vertical section on a line longitudinally of the vehicle, and extending through the apparatus illustrated in Figs. 1, 2 and 3.

Fig. 5 is a detail view of the parallel frame plates extending transversely of the vehicle, and provided with guiding slots engaging centrally located studs or rollers carried by the sashes for guiding them in their vertical movements.

Fig. 6 is a detail view of the central portion of the apparatus shown in Fig. 1, showing the pivoted adjustable sash supporting device on the sash alternating mechanism swung laterally to disconnect the innermost sash when in raised position from the sash alternating mechanism, and permitting it to be dropped to a greater or less extent to afford ventilation.

Fig. 7 is a partial view, similar to Fig. 1, showing the sash alternating slide to move to its central position and holding both sashes in raised position.

Fig. 8 is a detail perspective view illustrating a modified form of sash alternating slide in which the parts are formed in one piece from sheet metal for convenience of manufacture.

In the drawings, 1, represents the portion of the automobile forming the frame for the windshield aperture above the cowl, 3, and extending downwardly within the trunk, indicated at 2, the trunk being of sufficient capacity to enclose and house one or other of the alternating windshield sashes below the lower edge of the windshield aperture, and to contain the sash alternating mechanism. The frame, 1, is provided at each side with parallel guides, 5, 6 and 7, see Fig. 4, for the two windshield sashes. 8 and 9 are the two windshield sashes, each of which comprises a metallic enclosing frame, 8a and 9a, respectively, and a panel of glass, preferably of the non-shatterable type. In Fig. 4, for example, the sash, 8, which is the innermost sash, is shown in the fully raised position, completely closing the windshield opening, while the sash, 9, is enclosed entirely within the trunk. It will be understood that except for the provision hereinafter described for specially disconnecting the innermost sash from the sash alternating mechanism to lower it for ventilating purposes, one of these sashes is at all times supported and locked in exposed position to close the windshield opening, while the other is enclosed in the trunk, 2. For convenience of reference, we have termed the sash which is in raised position, the exposed sash and the one which is located within the trunk is termed the enclosed sash. Each sash is capable of vertical movement independently of the other within its vertical guides, and is moved by the sash alternating mechanism, hereinafter described, completely from the fully enclosed position, to the fully raised or exposed position, and vice versa.

Within the trunk and extending transversely across the car, parallel to the front and rear walls of the trunk, are a pair of parallel guide plates, 10 and 10a, illustrated in detail in Fig. 5, each of which is provided centrally with a vertical slot, indicated at 11, 11a, respectively. These plates are rigidly secured to the end portions of the trunk, for example, by suitable screws, indicated at 12 or otherwise. These plates may be formed separately or in one piece, having their lower edges connected by a portion, 10b. The frame of the innermost sash, 8, is provided centrally with a depending portion, indicated at 13, carrying a pair of vertically aligned studs, 14 and 15, having their centers in alignment with the center of the adjacent slot, 11, in the frame plate 10. Each of these studs is preferably provided with a flanged roller, indicated at 16 and 17, adapted to slide vertically in said slot, 11, the flanges of the rollers extending over the edges of the slot, thus guiding the sash in its vertical movements. The lower stud, 15, is of greater length than the stud, 14, and carries on its outer end an additional flanged roller, 18, which is in position to engage a portion of the sash alternating mechanism, hereinafter described. The outermost sash, 9, is provided with a similar depending portion, 13a, provided with similar studs, 14a, 15a, and a similar flanged roller 16a and a flanged roller, 17a and 18a, the rollers, 16a and 17a engaging the slot, 11a, and the frame, 10a, and the roller, 18a, extending forwardly to a greater extent to engage the sash alternating mechanism now to be described.

The sash alternating mechanism comprises a slide reciprocatable transversely of the vehicle and provided with oppositely disposed inclined guards, one of which engages the actuating roller, 18, of sash 8, while the other engages the actuating roller, 18a, of sash 9, for controlling the vertical movements of the sashes, and there is provided at the upper end of each of these guards a horizontally disposed supporting or locking portion, upon which the actuating roller rests when in the fully raised or exposed position. These guards terminate at their upper ends at points near the center of the slide, and obviously the horizontal locking portions extend therefrom in opposite directions. It will be understood that these grades are of such length that they will effect complete movements of the sashes from the fully enclosed position to the fully exposed position, and vice versa, according to the direction of movement of the slides. In association with each of these grades we prefer to employ a parallel depressing grade usually in the form of a bar supported above and parallel to the grade to engage the adjacent actuating roller so as to positively lower the sashes, and therefore not depend upon gravity or other means to effect the lowering thereof. In Figs. 1 to 4 the reciprocating slide is indicated at 20, mounted on horizontal guide rods, 21, 21, secured to the enclosing frame or the end walls of the trunk, or otherwise, to guide the reciprocatable slide in its movements. The slide, 20, is provided on opposite sides with vertically disposed plates, 22 and 22a. The plate, 22, which is shown in full lines in Fig. 1, is provided at the right in that figure with the inclined grade, indicated at 23, terminating at its upper end in a horizontal locking or supporting edge, 24, and the plate is shown as having cutaway portions, indicated at 25 and 26, to make it lighter. Parallel with the grade 23, is the depressing grade, in the form of a bar, 27, which is connected in this instance by brackets, 28, having their central portion offset, as shown in Fig. 2, to accommodate the flanges of the roller, 18, or in any other desired manner, with the plate, 22, and supported in such relation to the grade, 23, that its lower edge will engage the roller, 18, and positively draw down the exposed sash.

In dotted lines in Fig. 1, the rear plate, 22a, is shown, which is constructed in substantially the same manner, except that its inclined grade, 23a, is inclined oppositely to the grade, 23, and terminates at its upper end in this instance, at a point transversely opposite the termination of the grade, 23. The plate, 22a, is also provided with the horizontal locking portion, 24a, extending to the right in Fig. 1, or in the opposite direction from the locking portion, 24. We have shown the plate, 22a, provided with a depressing roller, 27a, connected with the plate by offset brackets, 28a, in the manner previously described, and the plate, 22a, is likewise shown as provided with cutaway portions, 25a and 26a, to lighten the structure. Extending longitudinally along the bottom of the slide, 20, is a rack bar, 29, adapted to engage a pinion, 30, on a shaft, 31, extending transversely through the trunk and operable by the driver or occupant of the vehicle, in any desired way, as by a hand crank, 32, indicated in Fig. 4. Obviously by rotating this crank, in one direction or the other, the slide can be moved transversely of the vehicle, in one direction or the other, under the control of the operator. The normal position of the slide as herein shown will be at one side or the other of the center of trunk according to which sash is in the exposed position. In Fig. 1, for example, the slide is shown at the right and the roller 18 of the inner sash, 8, is supported in the raised or exposed position, while the other sash, 9, shown in dotted lines in that figure, is in the enclosed position within the trunk, and we prefer to provide suitable buffers, which may be in the form of rubber stops or rollers, indicated for example, at 33, to limit the downward movement of the sash and support it against rattling.

Where it is desired to provide means for lowering the inner sash by hand from its fully raised position for ventilating purposes, the outer end of the locking portion, 24, of the plate, 22, is formed by the upper end of a movable rack bar, indicated at 34, which is pivoted at 35, at its lower end, to the plate, 22, and is provided with a series of supporting teeth, indicated at 36, at different points in its vertical length. This rack bar is held in vertical position by a spring, 37, against a suitable stop, 38, but is capable of swinging to the right in Fig. 1. This movement of the rack bar may be accomplished, for example, by an arm, 39, on a rock shaft, 40, extending through the front wall of the trunk and provided with a button, 41, the said arm, 39, engaging a projection, 42, on the upper end of the rack bar. The upper horizontal frame portion of the sash, 8, is provided with a finger piece, indicated at 43. It will thus be seen that when the innermost sash, 8, is in raised position, as shown in Fig. 1, the operator may swing the rack bar, 34, to the right, as indicated clearly in Fig. 6, after taking hold of the finger piece, 43, when the sash may be lowered to the desired extent and supported in any desired vertical position by permitting the rack bar to return, to the left, under the influence of its spring and bring one or other of the supporting teeth, 36, into engagement with the roller, 18.

It will be understood that while we regard this means for dropping the innermost sash for purposes of ventilation in fair weather as a very desirable feature of our construction, it may be omitted, in which case the roller, 18, would be supported at all times when the sash, 8, is in raised position by the horizontal locking portion, 24, of the plate, 22.

In Fig. 8, for example, we have shown a slight modification of the sash alternating apparatus, in which figure the parts are given the same reference numerals with the addition of 100. In this figure the slide, indicated at 120, and the vertically disposed parallel plates, 122 and 122a, are conveniently formed of sheet metal in one piece, the plate portions being bent at right angles to the slide portion, 120, which may be provided with a rack, by forming a longitudinal series of slits or apertures, 129, to receive the teeth of the actuating pinion. The ends of the slide portion, 120, are here shown as bent downwardly, at 120a, and provided with apertures, 120b, to receive the guide rods, 21, previously referred to. The slide as illustrated in Fig. 8 is constructed in all respects as hereinbefore described, except that in this instance the ratchet bar is omitted and horizontal locking portion, 124, of the plate, 122, is extended to the left far enough to support the actuating roller of the inner sash in its fully raised position.

The operation of the sash alternating device is as follows. It will be understood by reference to Fig. 1, that when the parts are in the positions therein shown, the sash, 8, is in the fully raised position and locked therein by its engagement with the horizontal locking portion, 24, in this instance the roller, 18, being supported by the upper end of the pivoted rack bar, 34, which in Fig. 1 forms a part of the horizontal locking edge or portion, 24, of plate, 22. Assuming that it is desired to alternate the sashes, the operator will rotate the shaft, 31, by means of the handle, 32, or other operating means, in such manner as to move the slide, 20, to the left. It will be noted that in the position of the parts as shown, the roller, 18a, of the sash, 9, which is in the enclosed position, is in engagement with the grade, 23a, of the plate 22a, as clearly shown in dotted lines in Fig. 1. As the sash alternating slide moves to the left, the grade, 23a, will raise the sash, 9, which is guided in its vertical movements by the engagement of its rollers, 16a, 17a, with the vertical slot, 11a, in the frame plate, 10a, thus preventing any tendency of the sash to bind. At the same time the horizontal locking portion, 24, of the plate, 22, is moved beneath the roller, 18, in Fig. 1. This movement continues until the roller, 18a, has reached the upper end of the grade, 23a, and the sash, 9, is raised to its full extent to close the windshield aperture, during which time the sash, 8, is still locked and supported in its highest position by the horizontal locking portion, 24, of plate, 22.

After the sash, 9, is brought to the fully raised position, its actuating roller, 18a, passes on to the horizontal locking portion, 24a, of the plate, 22a, and the actuating roller, 18, of sash, 8, passes off of the horizontal locking portion, 24, of plate, 22, and starts downwardly in engagement with the grade, 23, and between it and the depressing bar, 27, which insures its downward movement. This position of the parts is indicated clearly in Fig. 7. The sash, 8, will be guided, likewise in its vertical movements by the engagement of its rods, 16 and 17, with the slot, 11, of the frame plate. As the travel of the slide continues (to the left Fig. 7) the forward sash, 9, will be supported by the horizontal portion, 24a, of plate, 22a, while the sash, 8, will be depressed to its enclosed position within the trunk by the grade, 23, and depressing bar, 27, thus transposing the positions of the sashes, but at no time leaving the windshield aperture uncovered.

It will further be seen that by rotating the shaft, 31, in the opposite direction, the horizontal reciprocatable sash alternating mechanism will be moved to the right, the grade, 23, of plate, 22, raising the inner sash, 8, to its fully exposed position, closing the windshield aperture in rear of the sash, 9, thus bringing the parts back to the position indicated in Fig. 7, when the further movement of the sash alternating slide, to the right in that figure, will cause the roller, 18a, to pass downwardly between the grade, 23a, and the depressing bar, 27a, to its lowest position within the trunk, while the horizontal locking portion, 24, will pass beneath the roller, 18, of the sash, 8, and hold it locked in fully elevated position, the parts coming to rest in the position indicated in Fig. 1, with the roller, 18, supported as therein shown on the upper end of the bar, 34, where such bar is provided.

It will thus be seen that under ordinary circumstances one of the sashes is always in the elevated position and the other is in the lowered position within the trunk, and by moving the horizontal reciprocable sash alternating mechanism in one direction or the other, the enclosed sash is elevated to the fully exposed position to close the windshield aperture and locked in this position by the horizontally disposed locking portion, 24 (or 24a as the case may be) before the previously exposed sash is lowered into the trunk to its fully enclosed position.

It will also be understood that where the vertically disposed pivoted rack bar, 34, is provided on the plate, 22, as illustrated in Figs. 1 to 7, for example, the operator may, when the innermost sash, 8, is in the fully raised position, take that sash temporarily away from the control of the sash alternating mechanism, and by moving the pivoted rack bar, 34, to the right, that sash may be lowered to a greater or less extent for ventilating purposes, and supported upon one or other of the teeth, 36, of the rack bar, in the manner previously described, it being understood that when it is desired to again use the sash alternating mechanism, as in inclement weather, the sash, 8, will first be fully raised to the position shown in Fig. 1, and supported upon the continuation of the horizontal locking portion, 24, represented by the upper edge of the rack bar in that figure, thus restoring the sash, 8, to the control of the sash alternating mechanism previously described.

We prefer to provide the upper frame member of the sash, 9, with a wiper, 44, flexibly supported by a bracket, 45, so that the wiper engages the glass of the sash, 8, in its vertical movements and wipes the same, the said wiper, 44, preferably extending transversely the full width of the glass, and we also prefer to provide a second wiper, indicated at 46, and conveniently supported by a portion, 2a, of the trunk, forming a continuation of the cowl, 3. This wiper, 46, will engage the forward face of the glass in the sash, 9, in its vertical movements, and will wipe the same. These wipers are preferably made of rubber, felt or other suitable material, and are themselves flexible to yield readily in passing over the metallic frame portions of the sashes, where necessary.

It will thus be seen that when the vehicle is being operated during inclement weather, and the exposed windshield sash, whichever it may be, becomes covered with moisture, frost, rain, sleet or snow, so as to interfere with the driver's view of the road, the operator can quickly alternate the sashes by the means previously described, the enclosed sash being fully raised to and locked in its highest position before the previously exposed sash is lowered into the trunk, thus giving the operator a clean, dry windshield sash, while the previously exposed sash is warmed and dried within the trunk by the heat supplied by the engine, or by any other suitable heating means, as an electric heater. For example, we have illustrated in Fig. 4, a pair of heating coils, 50—50, within the trunk, for the purpose of supplying artificial heat should that be necessary, although under ordinary circumstances the heat from the engine compartment will be communicated to the trunk, sufficiently to accomplish the heating and drying action referred to. The bottom of the trunk is also provided preferably with a suitable drain pipe, 51, indicated in Fig. 4, for the removal of any water which may drain from the sashes and which may be discharged into the engine compartment or to the exterior of the vehicle, as may be found most desirable.

As previously described, when the vehicle is being operated in dry weather, and the sash, 8, is in raised position, as indicated in Fig. 4, for example, it may be disconnected from the sash alternating mechanism temporarily and lowered to the desired extent and supported in such lowered position where the pivoted rack bar, 34, is provided to afford ventilation of the vehicle, if desired.

What we claim and desire to secure by Letters Patent is:

1. In an alternating windshield, the combination with an enclosing trunk below the windshield aperture, a pair of independently movable sashes each capable of completely closing said aperture when in fully raised position, and of being enclosed in said trunk in lowered position, said sashes being each provided with an actuating part, vertical guiding means for said sashes, and a horizontally movable sash alternating mechanism provided with oppositely inclined grades and horizontally disposed locking portions for engaging said sash actuating part.

2. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades, each provided adjacent to its upper end with a horizontally disposed locking portion, each of said grades and its associated locking portion being located in position to engage the actuating part for one of said sashes, and means for reciprocating said sash alternating mechanism.

3. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades having their upper ends adjacent to each other and each provided adjacent to its upper end with a horizontally disposed locking portion, each of said grades and its associated locking portion being located in position to engage the actuating part of one of said sashes, and means for reciprocating said sash alternating mechanism.

4. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades located in different and parallel planes, each of said grades being provided adjacent to its upper end with a horizontally disposed locking portion, each of said grades and its associated locking portion being located in position to engage the actuating part of one of said sashes, and means for reciprocating said sash alternating mechanism.

5. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades located in different and parallel planes, each of said grades being provided adjacent to its upper end with a horizontally disposed locking portion, the upper ends of said grades being closely associated and said locking portions extending in opposite directions from their respective grades, each of said inclined grades and its associated locking portion being located in position to engage the actuating part of one of said sashes, and means for reciprocating said sash alternating mechanism.

6. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades located in different and parallel planes, each of said grades being provided adjacent to its upper end with a horizontally disposed locking portion, the upper ends of said grades being closely associated and said locking portions extending in opposite directions from their respective grades, each of said inclined grades and its associated locking portion being locked in position to engage the actuating part of one of said sashes, and an inclined depressing grade located above and substantially parallel to each of said first mentioned grades, for engaging the sash actuating part operable thereby and positively lowering the connected sash.

7. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, a horizontally reciprocatable slide movable longitudinally within said trunk and provided with vertically disposed plates in different and parallel planes, each of said plates being provided with an inclined grade terminating at its upper end in a horizontally disposed locking portion, for engaging the sash actuating part of one of said sashes, said grades being oppositely inclined and having their upper end terminating at points in substantial alignment transversely of the trunk, and said locking portions of said plates extending in opposite directions respectively from said points, each of said plates being provided with a depressing grade connected therewith and being supported above and parallel to its first mentioned grade, each of said plates with its inclined grades and horizontally disposed locking portions being in position to engage the actuating part of one of said sashes, and said inclined grades being of sufficient length to effect the movement of the sash operated thereby between its fully raised and fully depressed position, a horizontal rack secured to said slide, and a rotary shaft provided with a pinion engaging said rack for reciprocating said slide.

8. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades, each provided adjacent to its upper end with a horizontally disposed locking portion, each of said grades and its associated locking portion being located in position to engage the actuating part for one of said sashes, and means for reciprocating said sash alternating mechanism, one of said locking portions being provided with a movable part for engaging the adjacent sash actuating device and holding the connected sash locked when in raised position, and means for moving said movable part out of engagement with the said sash actuating part to disconnect it temporarily from the sash alternating means and permit the lowering of said sash independently thereof.

9. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades, each provided adjacent to its upper end with a horizontally disposed locking portion, each of said grades and its associated locking portion being located in position to engage the actuating part for one of said sashes, and means for reciprocating said sash alternating mechanism, one of said locking portions being provided with a movable part for engaging the adjacent sash actuating device and holding the connected sash locked when in raised position, and means for moving said movable part out of engagement with the said sash actuating part to disconnect it temporarily from the sash alternating means and permit the lowering of said sash independently thereof, said movable part being provided with supporting portions at different vertical points within said trunk to engage the said sash actuating part and support the connected sash at different elevations for purposes of elevation.

10. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades, each provided adjacent to its upper end with a horizontally disposed locking portion, each of said grades and its associated locking portion being located in position to engage the actuating part for one of said sashes, and means for reciprocating said sash alternating mechanism, one of said locking portions being provided with a vertically disposed pivoted rack bar having its upper end in alignment with said locking portion and forming a part thereof for holding the associated sash in fully raised position, said rack bar being provided with supporting projections at different points vertically of its length, a spring for holding said rack bar yieldingly in operative position, operator operated means for moving the upper end of said rack bar out of engagement with its associated sash actuating parts when in raised position to temporarily disconnect it from the sash alternating mechanism and permit the connected sash to be lowered and supported on one or other of said supporting projections for purposes of ventilation.

11. In an alternating windshield, the combination with an enclosing trunk below the windshield aperture, a pair of independently movable sashes each capable of completely closing said aperture when in fully raised position, and of being enclosed in said trunk when in lowered position, said sashes being each provided with an actuating part, vertical guiding means for said sash, and a horizontally reciprocatable sash alternating mechanism provided with oppositely disposed inclined grades, each provided adjacent to its upper end with a horizontally disposed locking portion, each of said grades and its associated locking portion being located in position to engage the actuating part for one of said sashes, and means for reciprocating said sash alternating mechanism, and means for disconnecting the actuating part of one of said sashes when in raised position, from its adjacent locking portion, to permit the sash to be raised and lowered by hand independently of the sash alternating mechanism for purposes of ventilation.

12. In an alternating windshield, the combination with an enclosing trunk below the windshield aperture, a pair of independently movable sashes each capable of completely closing said aperture when in fully raised position, and on being enclosed in said trunk when in lowered position, said sashes being each provided with an actuating part, vertically disposed sash guides engaging the end portions of said sashes, a pair of parallel frame plates supported within the trunk, and each provided with a vertically disposed guiding slot, guiding projections in different vertical planes on each of said frames engaging the guiding slot of one of said plates, and a horizontally reciprocatable sash alternating slide in said trunk provided with oppositely disposed inclined grades each terminating at its upper end in a horizontally disposed locking portion, one of said grades and its associated locking portion being in position to engage the actuating part for one of said sashes, guides for said reciprocatable slide extending longitudinally of said trunk, and operator operated means for reciprocating said slide, each of said grades being of sufficient length to effect the complete vertical movement of the sash operated thereby between its lowest and highest positions.

13. In an alternating windshield, the combination with an enclosing trunk below the windshield aperture, a pair of independently movable sashes each capable of completely closing said aperture when in fully raised position, and of being enclosed in said trunk in lowered position, said sashes being each provided with an actuating part, vertical guiding means for said sashes, and a horizontally reciprocatable slide formed in one piece and provided with a horizontally disposed part provided with a rack, and parallel vertical side plates provided each with an inclined grade terminating at its upper end in a horizontally disposed locking portion, the upper ends of said grades being in substantial alignment transversely of the slide, the horizontally disposed portion of the slide being provided with guiding portions, guides extending longitudinally of the trunk and engaging the guiding portions of said slide, an operating shaft provided with a pinion for engaging said rack, and means for rotating said shaft to effect the reciprocation of said slide, each of said grades and its associated locking portion being located in position to engage the sash actuating part of one of said sashes.

In testimony whereof we affix our signatures.

JOSEPH MAGIDSON
SIDNEY E. BARTH.
HARRY MAGIDSON.